United States Patent
Ohsono et al.

(10) Patent No.: US 6,626,782 B1
(45) Date of Patent: Sep. 30, 2003

(54) BELT FOR CONTINUOUSLY VARIABLE TRANSMISSION

(75) Inventors: Kouhei Ohsono, Wako (JP); Shigeru Kanehara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/607,861

(22) Filed: Jun. 30, 2000

(30) Foreign Application Priority Data

Jul. 5, 1999 (JP) .......................................... 11-190053

(51) Int. Cl.[7] ................................................ F16G 1/21
(52) U.S. Cl. ........................................ 474/242; 474/201
(58) Field of Search ................................ 474/201, 240, 474/242, 245

(56) References Cited

U.S. PATENT DOCUMENTS

| | | | | |
|---|---|---|---|---|
| 4,610,648 A | * | 9/1986 | Miranti, Jr. | 474/242 |
| 5,342,251 A | * | 8/1994 | Kanehara et al. | 474/242 |
| 5,346,440 A | * | 9/1994 | Smeets | 474/242 |
| 6,090,004 A | * | 8/2000 | Kanehara et al. | 474/242 |

FOREIGN PATENT DOCUMENTS

| | | | | |
|---|---|---|---|---|
| EP | 0 298 258 A1 | * | 11/1989 | F16G/5/16 |
| EP | 0 562 654 A | | 9/1993 | |
| FR | 2 416 091 A | | 8/1979 | |
| JP | 59-79653 | | 5/1984 | |
| JP | 60-107444 | | 7/1985 | |
| JP | 63-17353 | | 2/1988 | |
| JP | 3-229038 | * | 3/1991 | F16G/5/16 |
| JP | 6-10993 | | 1/1994 | |

* cited by examiner

Primary Examiner—William C Joyce
Assistant Examiner—Timothy McAnulty
(74) Attorney, Agent, or Firm—Arent Fox Kintner Plotkin & Kahn, PLLC

(57) ABSTRACT

A belt for a continuously variable transmission is provided, which is comprised of metal ring assemblies each having a plurality of endless metal rings laminated one on another, and a plurality of metal elements each having ring slots into which the metal ring assemblies are fitted, and the belt is wound around a drive pulley and a driven pulley to transmit a driving force between the pulleys. When the belt leaves the driven pulley, the metal element falls forward in the direction of advancement with respect to the metal ring assembly. For this reason, a rear end of a saddle surface of the ring slot in the direction of advancement is brought into strong abutment against an inner circumferential surface of the metal ring assembly to produce a concentrated stress, thereby shortening the life of the metal ring assembly. In order to prevent this, the radius of curvature of the rear end of the saddle surface in the direction of advancement is larger than that of its front end to reduce the concentrated stress. When the metal element is formed by a fine blanking process, the radius of curvature of the rear end of the saddle surface in the-direction of advancement is automatically increased by a punching shear drop.

3 Claims, 14 Drawing Sheets

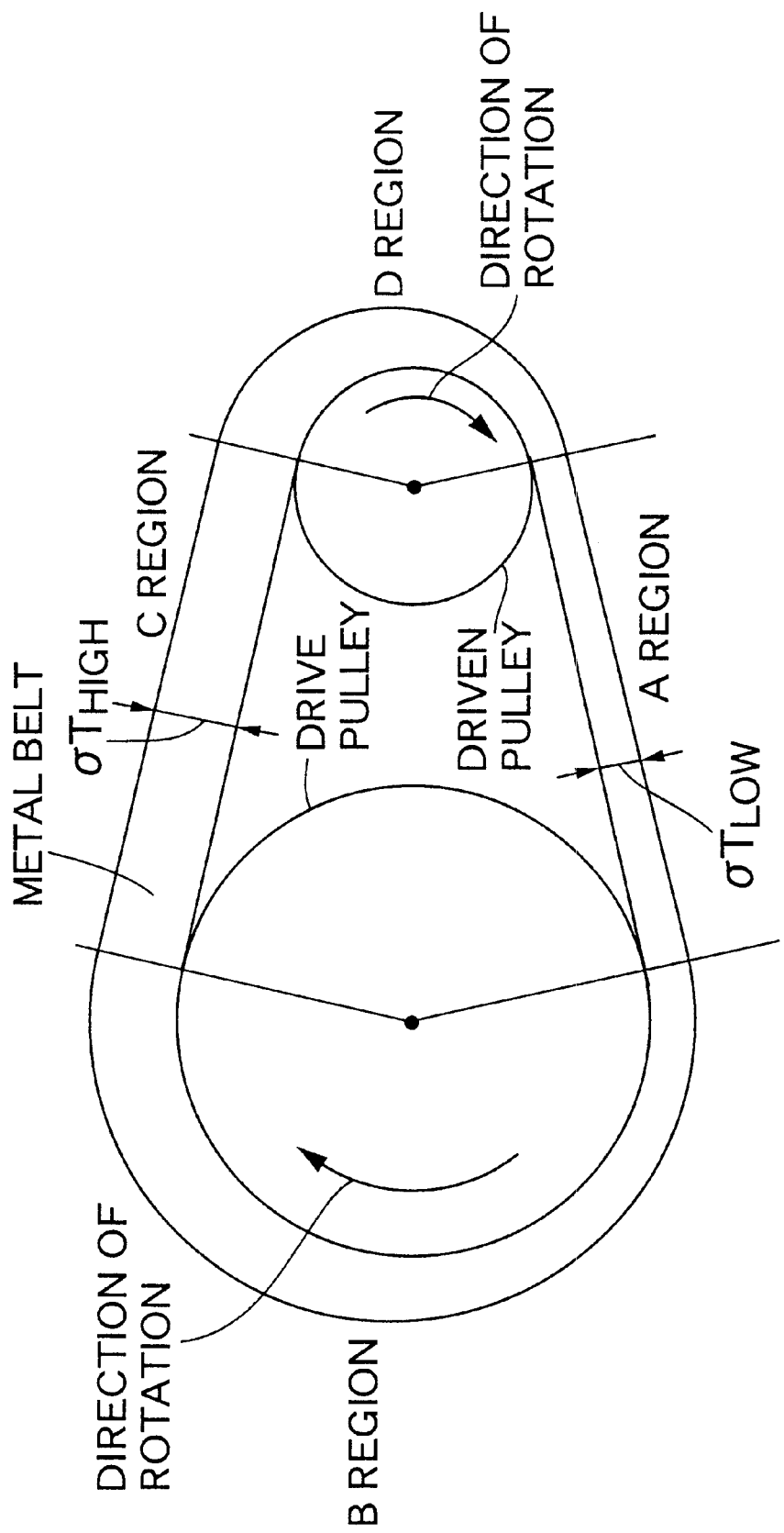

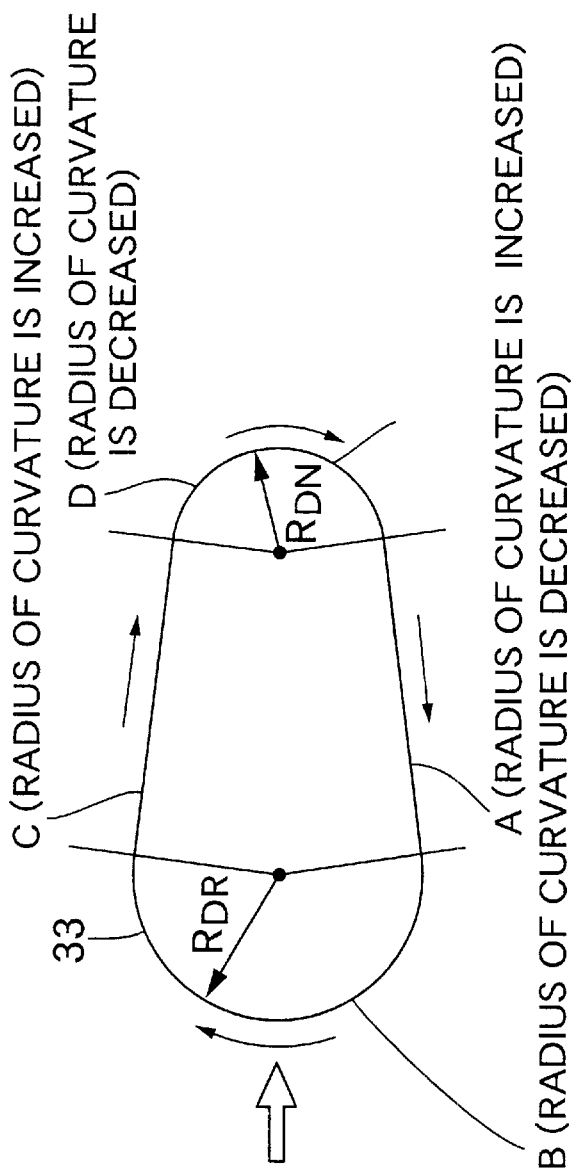
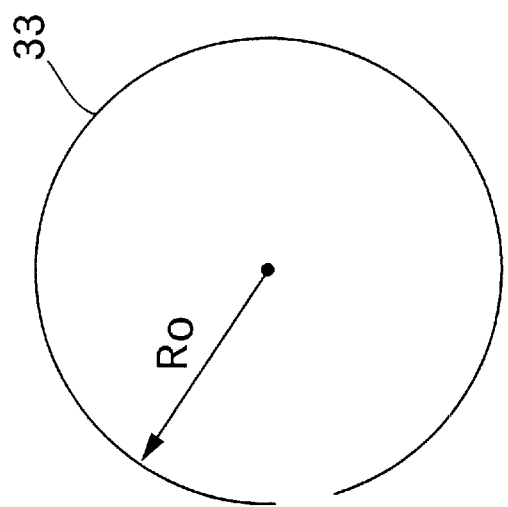

TANGENT FRICTIONAL FORCE F

TANGENT FRICTIONAL FORCE F

URGING FORCE E BETWEEN METAL ELEMENTS

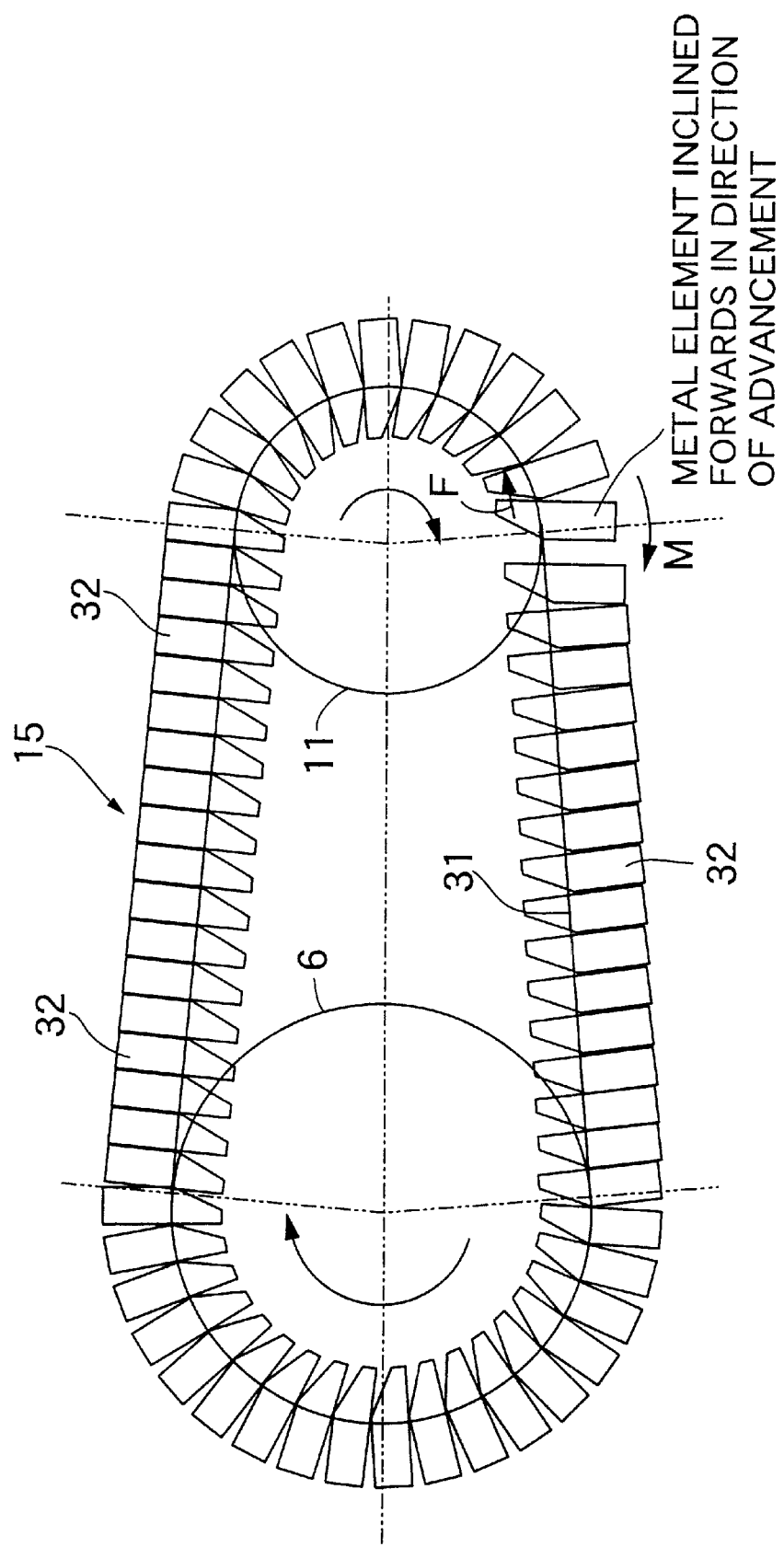

BELT FOR CONTINUOUSLY VARIABLE TRANSMISSION

BACKGROUND OF THE INVENTION

1. Field of the Invention

The present invention relates to a belt for a continuously variable transmission, which is comprised of metal ring assemblies each having a plurality of endless metal rings laminated one on another, and a plurality of metal elements each having ring slots into which the metal ring assemblies are fitted, the belt being wound around a drive pulley and a driven pulley to transmit a driving force between the pulleys.

2. Description of the Related Art

For explaining how forces generally act on a belt and its components during operation of a continuously variable transmission, reference is now made to FIGS. 7, 8, 10A and 10B which are part of the drawings illustrating an embodiment of the invention.

As shown in FIG. 8, when a metal element 32 supported with a ring slot 35 thereof fitted over a metal ring assembly 31 is inclined forwards in a direction of advancement, a rear end a (in the direction of advancement) of a saddle surface 44 is brought into abutment against an inner surface of the metal ring assembly 31. This causes a problem that a large stress σH (a hertz-stress) is produced at the rear end a which exerts a deleterious effect on the durability of the metal ring assembly 31. The forward (in the direction of advancement) inclination of the metal element 32 is caused by a tangent frictional force F which the metal element 32 receives on its pulley contact surface, and an urging force E provided between the metal elements 32. This tendency is particularly significant in an exit region of the driven pulley. The reason will be described below.

As can be seen from FIG. 7, a moment generated in the direction of an arrow M by the tangent frictional force F acts to lower the metal element 32 forwards in the direction of advancement about the swinging center C. On the other hand, a radial frictional force μE generated by the urging force E provided between the metal elements 32 generates a moment in the direction of an arrow M' on the metal element 32. This moment acts to lower the metal element 32 backwards in the direction of advancement about the swinging center C.

It is known that the tangent frictional force F, which the metal element 32 receives from a drive pulley 6 or a driven pulley 11, is increased in an exit region of the pulley 6 or 11, as shown in FIG. 10A, and such tangent frictional force F reaches four times the value provided when it is assumed that the tangent frictional force F has been distributed averaged over the entire wound region of the pulley 6, 11, for example, for the reason that the pulleys 6, 11 are deformed, whereby the axial thrust is concentrated. In addition, as shown in FIG. 10B, the urging force E between the metal elements 32 assumes a large value in the exit region of the drive pulley 6, but assumes 0 (zero) in the exit region of the driven pulley 11. Therefore, the metal element 32 is liable to be inclined forwards in the direction of advancement to the maximum extent in a location where the tangent frictional force F inclining the metal element 32 forwards in the direction of advancement is the maximum and the urging force E inhibiting the forward (in the direction of advancement) inclination of the metal element 32 assumes 0 (zero), i.e., in the exit region of the driven pulley 11.

When the metal element 32 is greatly inclined forward in the direction of advancement in the exit region of the driven pulley 11 for the above-described reason, the following problem is encountered: A rear end a (in the direction of advancement) of a saddle surface 44 of the ring slot 35 in the metal element 32 is brought into strong abutment against an inner circumferential surface of the metal ring assembly 31 (see FIG. 8), whereby the fatigue life of the metal ring assembly 31 is shortened by the stress σH generated at the rear end a.

There are conventional known metal elements which are described in Japanese Utility Model Applications Laid-Open Nos. 59-79653 and 63-17353, Japanese Patent Application Laid-Open No. 6-10993 and Japanese Utility Model Application Laid-Open No. 60-107444, and which have a feature in the shape of a saddle surface against which an inner circumferential surface of a metal ring assembly abuts.

In the metal element described in Japanese Utility Model Application Laid-Open No. 59-79653, opposite ends of the saddle surface of the metal element in the direction of advancement are chamfered smoothly., In the metal element described in Japanese Utility Model Application Laid-Open No. 63-17353, a stepped projection is formed at a central (in the direction of advancement) portion of the saddle surface of the metal element, and an arcuate surface having a radius equal to a minimum wound radius of a metal ring assembly is formed at a top surface of the projection. The object of such arrangement is not described in the publication, but it is believed that the inventors have intended to moderate the strong abutment of the opposite (in the direction of advancement) ends of the saddle surface against the inner circumferential surface of the metal ring assembly in a region where a belt for a continuously variable transmission is wound around a pulley. In these metal elements, it is difficult to effectively moderate a hertz stress generated by the abutment of the rear (in the direction of advancement) end of the saddle surface against the inner circumferential surface of the metal ring assembly in an exit region of a driven pulley, because the shape of the saddle surface is symmetrical about its center in the direction of advancement.

In the metal elements described in Japanese Patent Application Laid-Open No. 6-10993 and Japanese Utility Model Application Laid-Open No. 60-107444, the saddle surface of the metal element is formed into an asymmetrical shape such that a rear (in the direction of advancement) portion of the saddle surface is lower in level than a front portion of the saddle surface. The object of such arrangement is to prevent the metal element from falling forwards and backwards by a pitching moment. These metal elements suffer a problem that the shape of the saddle surface is complicated, resulting in an increased processing cost.

SUMMARY OF THE INVENTION

Accordingly, it is an object of the present invention to prevent a reduction in the durability of the metal ring assembly due to the inclination of the metal element, without increasing of the processing cost of the metal element.

To achieve the above object, according to a first aspect and feature of the present invention, there is provided a belt for a continuously variable transmission having a drive pulley and a driven pulley, comprising metal ring assemblies each having a plurality of endless metal rings laminated one on another, and a plurality of metal elements each having ring slots into which the metal ring assemblies are fitted. The belt is wound around the drive pulley and the driven pulley to transmit a driving force between both the pulleys, wherein a saddle surface of the ring slot, against which an inner circumferential surface of the metal ring assembly abuts, is formed so that the radius of a rear corner is larger than that of a front corner in a direction of advancement of the metal elements.

With the above arrangement, when the metal element moved away from the driven pulley, falls forwards in the direction of advancement, the corner of the saddle surface of the ring slot located on the rear side in the direction of advancement and having the larger radius is urged against the inner circumferential surface of the metal ring assembly. Therefore, it is possible to maintain the hertz stress generated on the inner circumferential surface of the metal ring assembly to the minimum to enhance the durability of the metal ring assembly.

According to a second aspect and feature of the present invention, each of the metal elements is formed by punching from a metal plate material,-and the rear corner in the direction of advancement is produced by a punching shear drop upon the punching.

With the above arrangement, the corner of the saddle surface of the metal element located on the rear side in the direction of advancement and having the larger radius, is produced as the punching shear drop upon punching of the metal plate material, to form the metal element. Therefore, it is possible to form the corner having the larger radius without carrying-out of a special processing.

According to a third aspect and feature of the present invention, the belt is used in a continuously variable transmission of a vehicle, and the direction of advancement of the metal element is the advancing direction during forward traveling of the vehicle.

With the above arrangement, the corner having the larger radius can be urged against the inner circumferential surface of the metal ring assembly during forward traveling of the vehicle to enhance the durability of the metal ring assembly by ensuring that the advancing direction of the metal element corresponds to the advancing direction during forward traveling of the vehicle, because the frequency of forward traveling of the vehicle is overwhelmingly higher than the frequency of backward traveling of the vehicle.

The above and other objects, features and advantages of the invention will become apparent from the following description of the preferred embodiment taken in conjunction with the accompanying drawings.

BRIEF DESCRIPTION OF THE DRAWINGS

FIGS. 1 to 11 show a first embodiment of the present invention, wherein

FIG. 1 is a skeleton illustration of a power transmitting system of a vehicle provided with a continuously variable transmission.

FIG. 2 is a partial perspective view of a metal belt.

FIG. 3 is a diagram of the entire arrangement of a fine blanking apparatus.

FIG. 4 is a diagram showing the distribution of the tensile stress acting on a metal ring.

FIGS. 5A and 5B are diagrams showing the metal ring in a free state and a wound state, respectively.

FIG. 6 is a diagram showing the distribution of the total stress acting on an innermost metal ring.

FIG. 7 is a side view of the metal element in a righted state.

FIG. 8 is a side view of the metal element in an inclined state.

FIG. 11 is a diagram showing the inclination of the metal element in the vicinity of an exit of a driven pulley.

FIGS. 12 and 13 show a second embodiment of the present invention, wherein

FIG. 12 is a diagram of the entire arrangement of a fine blanking apparatus.

FIG. 13 is a side view of a metal element in an inclined state.

DESCRIPTION OF THE PREFERRED EMBODIMENTS

The present invention will now be described by way of embodiments with reference to the accompanying drawings.

FIGS. 1 to 11 show a first embodiment of the present invention.

Figure 2:
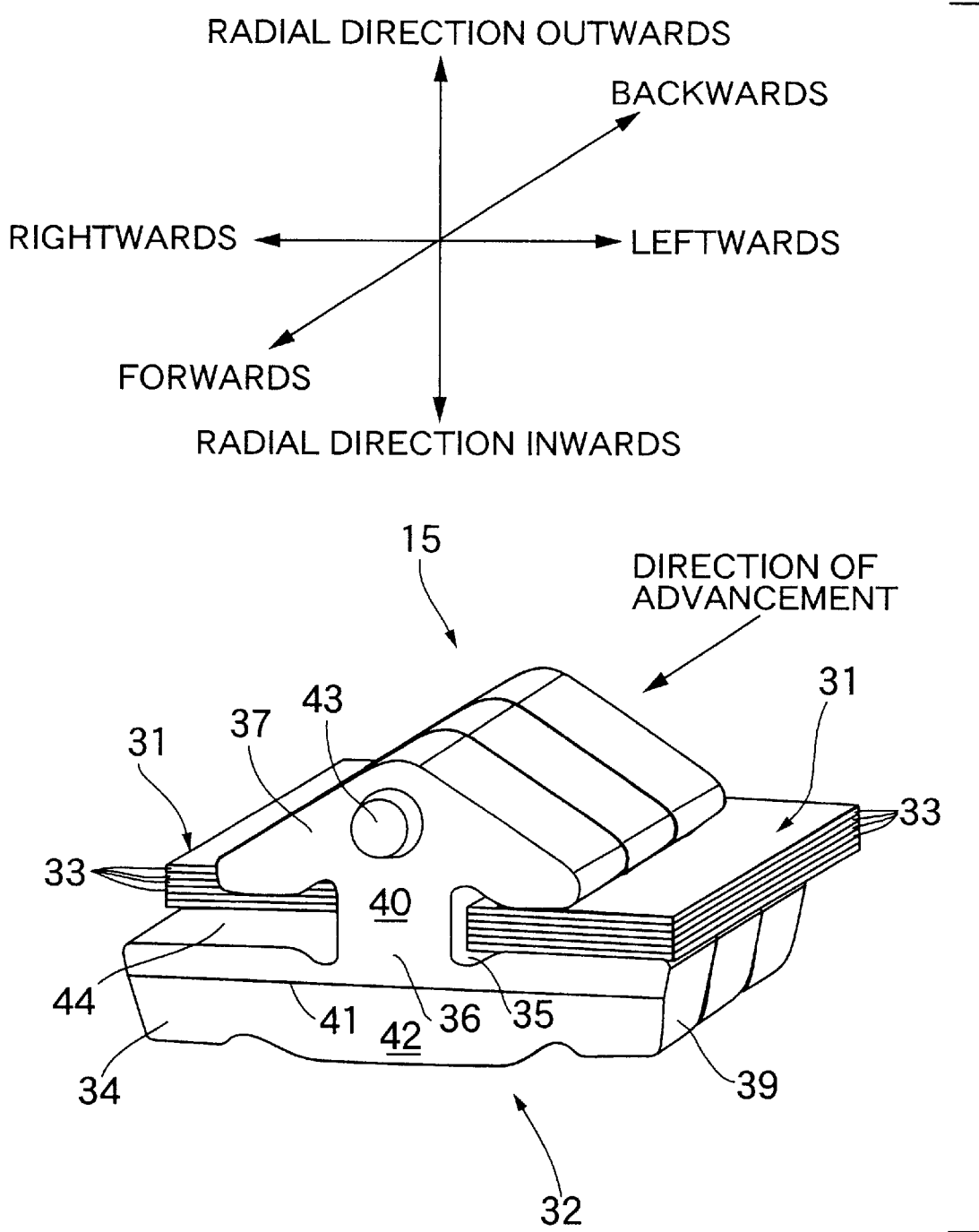

The definition of forward and backward directions, a lateral direction and a radial direction of a metal element, used in describing the embodiments is shown in FIG. 2. The radial direction is defined as the radial direction of a pulley against which the metal element abuts. A location closer to the axis of revolution or rotation of the pulley is a radially inner location, and a location farther from the axis of revolution of the pulley is a radially outer location. The lateral direction is defined as a direction along the axis of revolution of the pulley against which the metal element abuts. The forward and backward directions are defined as directions along the direction of advancement of the metal element during forward traveling of a vehicle.

Figure 1:
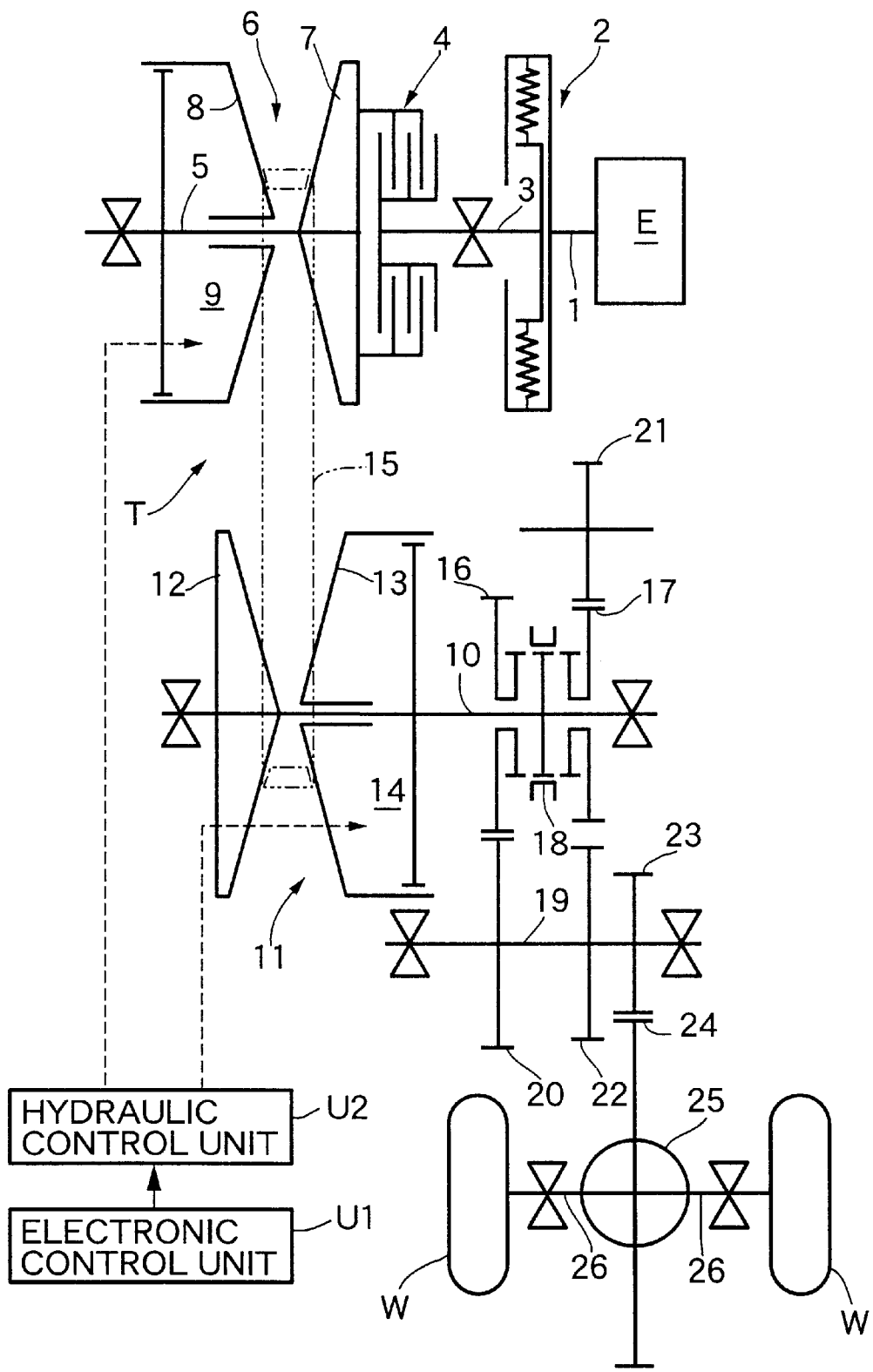

FIG. 1 schematically shows the structure of a metal belt type continuously variable transmission T mounted in an automobile. An input shaft 3 connected to a crankshaft 1 of an engine E through a damper 2 is connected to a drive shaft 5 of the metal belt type continuously variable transmission T through a start clutch 4. A drive pulley 6 provided on the drive shaft 5, includes a stationary pulley half 7 secured to the drive shaft 5, and a movable pulley half 8 which can be moved toward and away from the stationary pulley half 7. The movable pulley half 8 is biased toward the stationary pulley half 7 by hydraulic pressure applied to an oil chamber 9.

A driven pulley 11 is provided on a driven shaft 10 disposed in parallel to the drive shaft 5, and includes a stationary pulley half 12 secured to the driven shaft 10, and a movable pulley half .13 which can be moved toward and away from the stationary pulley half 12. The movable pulley half 13 is biased toward the stationary pulley half 12 by hydraulic pressure applied to an oil chamber 14. A metal belt 15 is wound around the drive pulley 6 and the driven pulley 11 (see FIG. 2). The metal belt 15 comprises a plurality of metal elements 32 supported on a pair of left and right metal ring assemblies 31, 31. Each of the metal ring assemblies 31, 31 comprises twelve metal rings 33 which are laminated one on another.

A forward drive gear 16 and a backward drive gear 17 are relatively rotatably supported on the driven shaft 10. The forward and backward drive gears 16 and 17 can be coupled selectively to the driven shaft 10 by a selector 18. A forward driven gear 20 meshed with the forward drive gear 16 and a backward driven gear 22 meshed with the backward drive gear 17 through a backward idling gear 21, are secured to an output shaft 19, which is disposed in parallel to the driven shaft 10.

The revolution or rotation of the output shaft 19 is input to a differential 25 through a final drive gear 23 and a final driven gear 24, and is transmitted therefrom through left and right axles 26, 26 to driven wheels W, W.

A driving force of the engine E is transmitted to the driven shaft 10 through a crankshaft 1, the damper 2, the input shaft 3, the start clutch 4, the drive shaft 5, the drive pulley 6, the metal belt 15 and the driven pulley 11. When a forward travel range is selected, the driving force of the driven shaft 10 is transmitted to the output shaft 19 through the forward drive gear 16 and the forward driven gear 20, thereby allowing the vehicle to travel forwards. When a backward travel range is selected, the driving force of the driven shaft 10 is transmitted to the output shaft 19 through the backward drive gear 17, the backward idling gear 21 and the backward driven gear 22, thereby allowing the vehicle to travel backwards.

At that time, hydraulic pressure applied to the oil chamber 9 of the drive pulley 6 and the oil chamber 14 of the driven pulley 11 of the metal belt type continuously variable transmission T is controlled by a hydraulic pressure control unit $U_2$ which is operated by a command from an electronic control unit $U_1$, thereby adjusting the change gear ratio continuously or in a stepless manner. That is, if hydraulic pressure applied to the oil chamber 14 of the driven pulley 11 is increased relative to hydraulic pressure applied to the oil chamber 9 of the drive pulley 6, the groove width of the driven pulley 11 is reduced, leading to an increased effective radius, and correspondingly, the groove width of the drive pulley 6 is increased, leading to a reduced effective radius.

Therefore, the change gear ratio of the metal belt type continuously variable transmission T is varied toward a low gear ratio continuously or in a stepless manner. On the other hand, if the hydraulic pressure applied to the oil chamber 9 of the drive pulley 6 is increased relative to the hydraulic pressure applied to the oil chamber 14 of the driven pulley 11, the groove width of the drive pulley 6 is reduced, leading to an increased effective radius, and correspondingly, the groove width of the driven pulley 11 is increased, leading to a reduced effective radius. Therefore, the change gear ratio of the metal belt type continuously variable transmission T is varied toward a high gear ratio continuously or in the stepless manner.

As shown in FIG. 2, each of the metal elements 32 which is formed from a metal plate by punching or stamping includes a substantially trapezoidal element body 34, a neck 36 located between a pair of left and right ring slots 35, 35 into which the metal ring assemblies 31, 31 are fitted, and a substantially triangular ear 37 connected to an upper portion of the element body 34 through the neck 36. The element body 34 is formed at its laterally opposite ends with a pair of pulley abutment surfaces 39, 39 capable of abutting against V-surfaces of the drive pulley 6 and the driven pulley 11. The metal element 32 is formed, at its front and rear portions in the direction of advancement, with a pair of front and rear main surfaces 40, 40 which are perpendicular to the direction of advancement and parallel to each other. An inclined surface 42 is formed below the front main surface 40 in the direction of advancement with a laterally extending rocking edge 41 located therebetween. Further, the ear 37 is formed, at its front and rear surfaces, with a projection 43 and a corresponding recess which can be fitted to each other to connect the metal elements 32, 32 adjacent to each other in the forward and backward directions.

The structure of a fine blanking apparatus for producing the metal element 32 by punching or stamping will be described below with reference to FIG. 3.

The fine blanking apparatus 51 is designed to produce the metal element 32 from a metal plate material 52 by punching or stamping. The fine blanking apparatus 51 includes a lower stationary die 53 which supports a lower surface of the metal plate material 52, an upper die 55 which is lifted and lowered by cylinders 54, 54 to support an upper surface of the metal plate material 52, a counter punch 57 which is liftably and lowerably accommodated in a recess in the lower die 53 and biased upwards by means of a cylinder 56, and a punch 59 which is accommodated in a recess in the upper die 55 and is lifted and lowered by means of a cylinder 58.

The production of the metal element 32 in a punching manner by the fine blanking apparatus 51 having the above-described structure is carried out in a procedure which will be described below. First, in a state in which the metal plate material 52 has been placed on the lower die 53, the cylinders 54, 54 are expanded to lower the upper die 55, whereby the metal plate 52 is clamped between the lower die 53 and the upper die 55. When the cylinder 58 is then expanded to lower the punch 59, a portion of the metal plate material 52 clamped between the punch 59 and the counter punch 57 is lowered, while receiving a reaction force provided by the cylinder 56, whereby the metal plate material 52 is punched to produce a metal element 32 by shearing force generated between the lower die 53. and the upper die 55. FIG. 3 shows the fine blanking apparatus in a state in which it is in the middle of the production of the metal element 32 by punching. The downward-directed rear (as viewed in the direction of advancement) surface of the metal element 32 is opposed to the lower die 53 and the counter punch 57.

Figure 7:
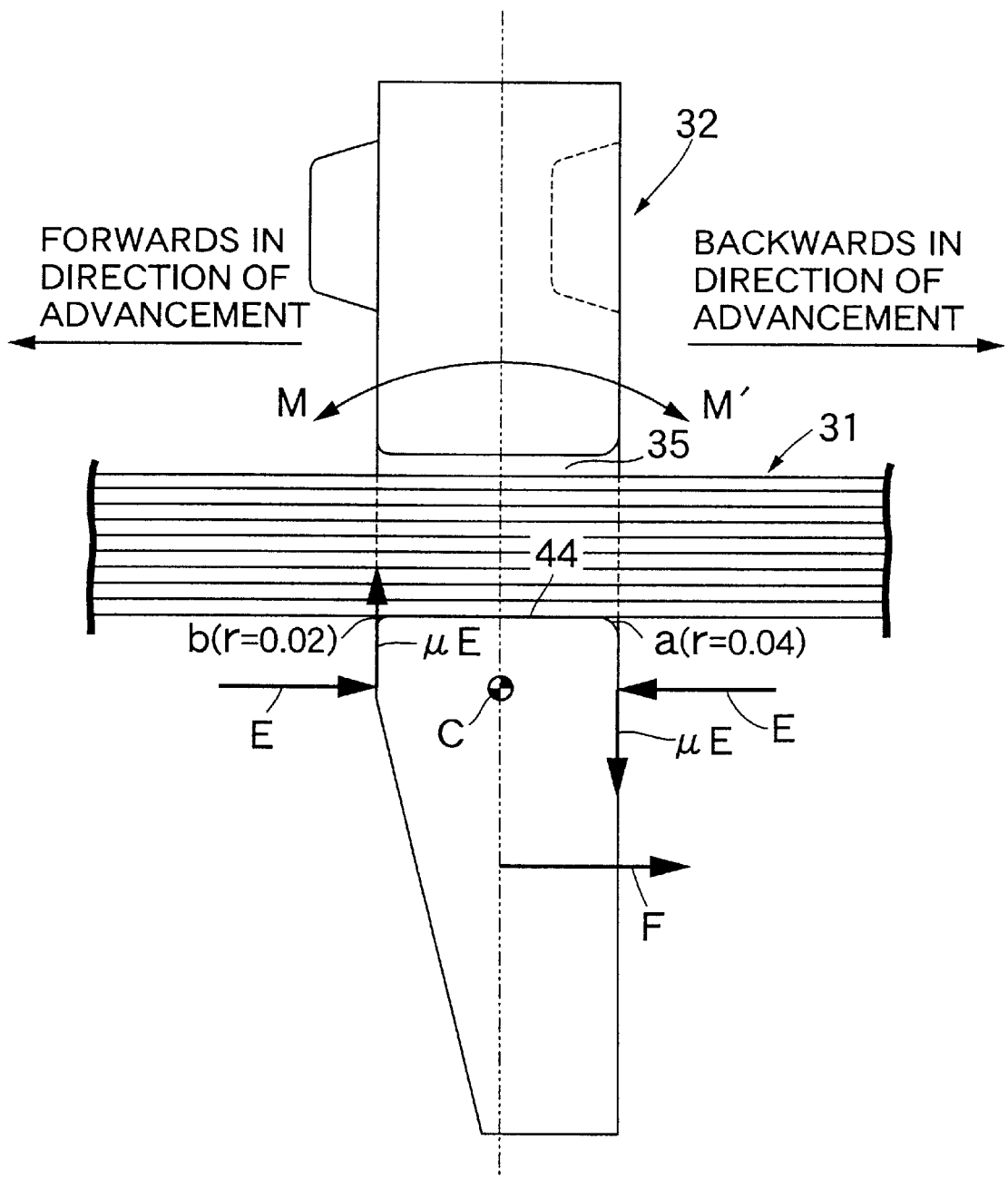

In the course of the punching for the metal element 32, a punching shear drop is produced at each of the peripheral edge portions (portions surrounded by circles in FIG. 3) of the metal element 32 facing the boundary between the lower die 53 and the counter punch 57, and the section of the punching shear drop is of an arcuate shape with no sharp edge. As shown in FIG. 7, in general, when flashes are removed by barreling after the punching production of the metal element 32, the radius r of curvature of front one b (at which no punching shear drop is produced) of opposite ends of the metal element 32 in the direction of advancement of a saddle surface 44 of the ring slot 35 assumes a value as small as about 0.02 mm as a result of chamfering, attendant to the removal of the flashes, on the one hand, and the radius r of curvature of rear one a (at which the punching shear drop is produced) of the opposite ends assumes a value as large as about 0.04 mm, on the other hand.

FIG. 4 shows the drive pulley 6 and the driven pulley 11 in a highest speed travel state (in a "TOP" state) of the vehicle in which the effective radius of the drive pulley 6 is larger than that of the driven pulley 11. The thickness of the metal belt 15 in FIG. 4 diagrammatically represents the magnitude of tensile stress of the innermost metal ring 33 due to the tension of the metal belt 15. In a chord section (the A region) on a return side where the metal belt 15 is returned from the driven pulley 11 to the drive pulley 6, the stress is a given value $\sigma T_{LOW}$, and in a chord section on an advance side (the C region) where the metal belt 15 is delivered from the drive pulley 6 to the driven pulley 11, the stress is a given value $\sigma T_{HIGH}$. The stress $\sigma T_{LOW}$ in the A region is smaller than the stress $\sigma T_{HIGH}$ in the C region. The stress is increased from $\sigma T_{LOW}$ to $\sigma T_{HIGH}$ between an entrance and an exit in a section (the B region) where the metal belt 15 is wound around the drive pulley 6, while the stress is decreased from $\sigma T_{HIGH}$ to $\sigma T_{LOW}$ between an entrance and an exit in a section (the D region) where the metal belt 15 is wound around the driven pulley 11 (see a dashed line in FIG. 6).

In addition to the tensile stress based on the tension, a tensile stress and a compressive stress based on the flexure are applied to the metal ring 33. As shown in FIGS. 5A and 5B, the metal ring in a free state is circular, but the metal ring in a service state is deformed into a shape having the A to D regions. In the return-side chord section (the A region) and the advance-side chord section (the C region), the radius of curvature which is $R_0$ in the free state is increased infinitely (4); in the B region where the metal belt 15 is wound around the large-diameter drive pulley, the radius of curvature which is $R_0$ in the free state, is decreased to $R_{DR}$, and in the D region where the metal belt 15 is wound around the small-diameter driven pulley, the radius of curvature which is $R_0$ in the free state, is decreased to $R_{DN}$.

In this way, in the A and C regions where the radius of curvature of the metal ring 33 is increased, the tensile flexural stress acts on the inner circumferential surface of the metal ring 33, and the compressive flexural stress acts on the outer circumferential surface of the metal ring 33. On the other hand, in the B and D regions where the radius of curvature of the metal ring 33 is decreased, the compressive flexural stress acts on the inner circumferential surface of the metal ring 33, and the tensile flexural stress acts on the outer circumferential surface of the metal ring 33. Thus, a given tensile flexural stress $\sigma V_{ST}$ acts on the inner circumferential surface of the metal ring 33 in the two chord sections (the A and C regions). A relatively small compressive flexural stress $\sigma V_{DR}$ acts on the inner circumferential surface of the metal ring in the B region where the metal ring 33 is wound around the drive pulley 6 having the large radius of curvature, and a relatively large compressive flexural stress $\sigma V_{DN}$ acts on the inner circumferential surface of the metal ring in the D region where the metal ring 33 is wound around the driven pulley 11 having the small radius of curvature.

Figure 6:
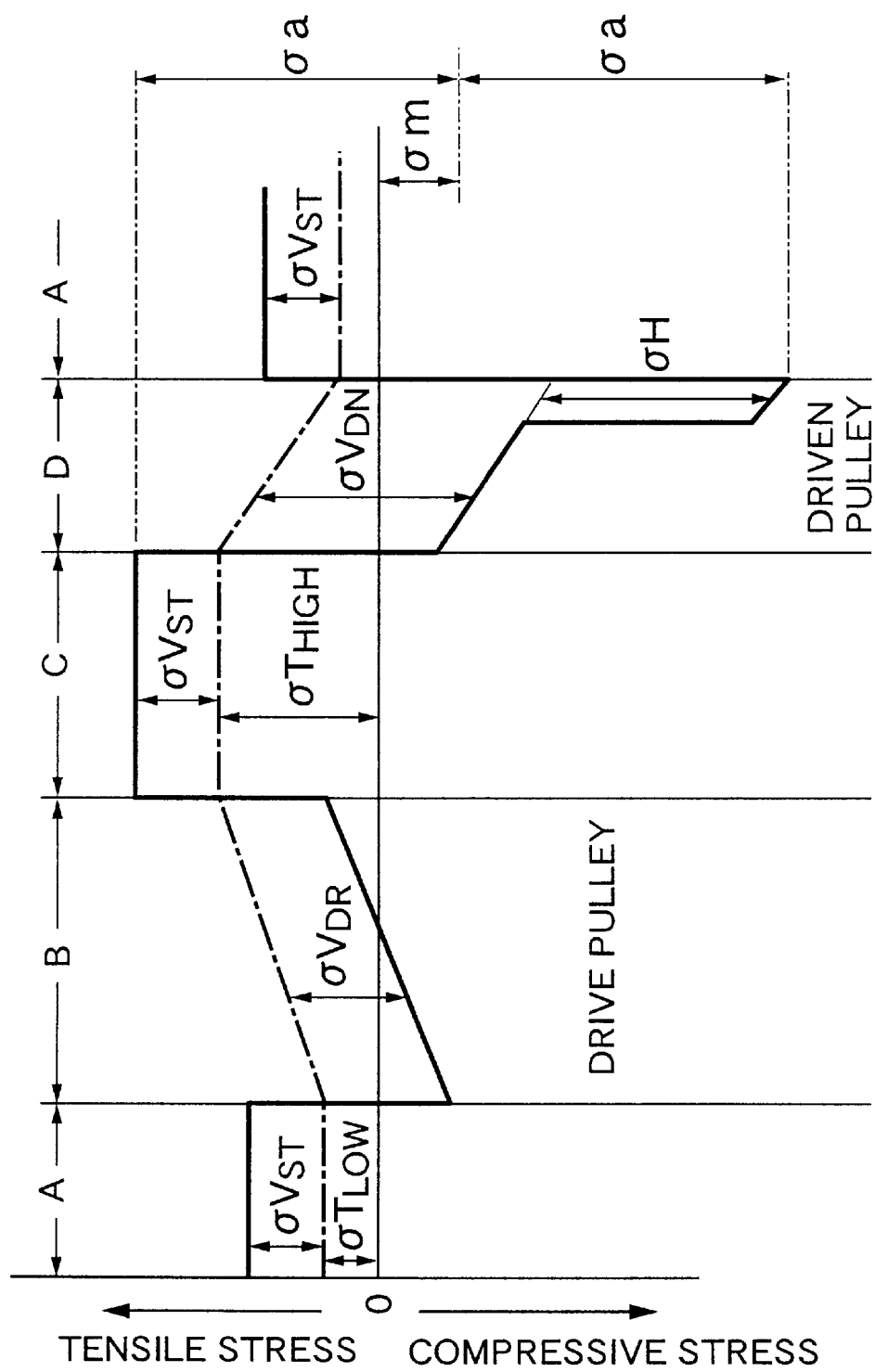

FIG. 6 shows a variation in total stress resulting from the addition of a stress acting based on the tension of the inner circumferential surface of the innermost metal ring 33 and a stress acting on the inner circumferential surface of the innermost metal ring 33 based on the flexure. It can be seen in FIG. 6 that a large concentrated stress $\sigma H$ acts at a terminal end of the region D (a location at which the metal element 32 leaves the driven pulley 11). This concentrated stress $\sigma H$ is produced for the reason that the metal element 32 falls forward in the direction of advancement at the location at which the metal element 32 leaves the driven pulley 11, whereby the rear end a (in the direction of advancement) of the saddle surface 44 strongly abuts against the inner circumferential surface of the innermost metal ring 33 as explained in FIGS. 7 and 8. The concentrated stress $\sigma H$ is a hertz stress produced by the abutment of the rear end a (in the direction of advancement) of the saddle surface 44 which can be regarded as a portion of a column, against the inner circumferential surface of the innermost metal ring 33 which can be regarded as a plane.

Figure 9A:
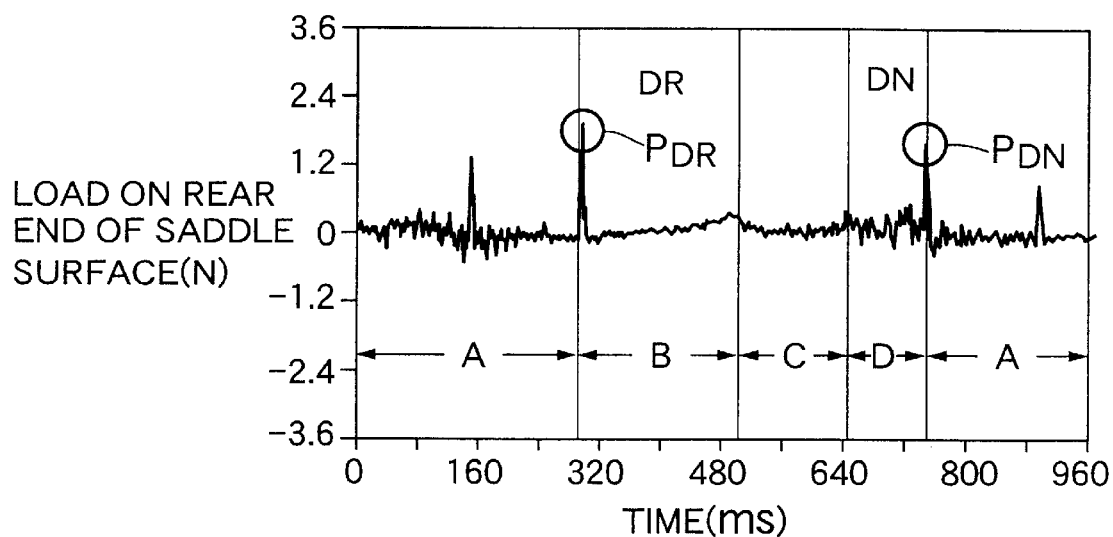
FIGS. 9A and 9B are graphs each showing the peak load acting on each of front and rear ends of a saddle surface in the direction of advancement.
Figure 9B:
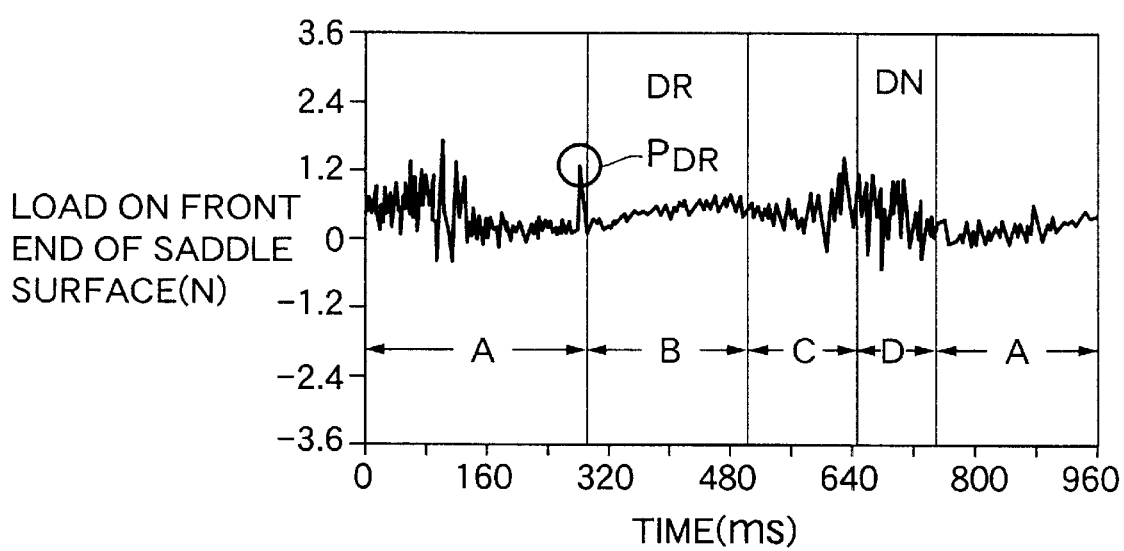
Figure 10A:
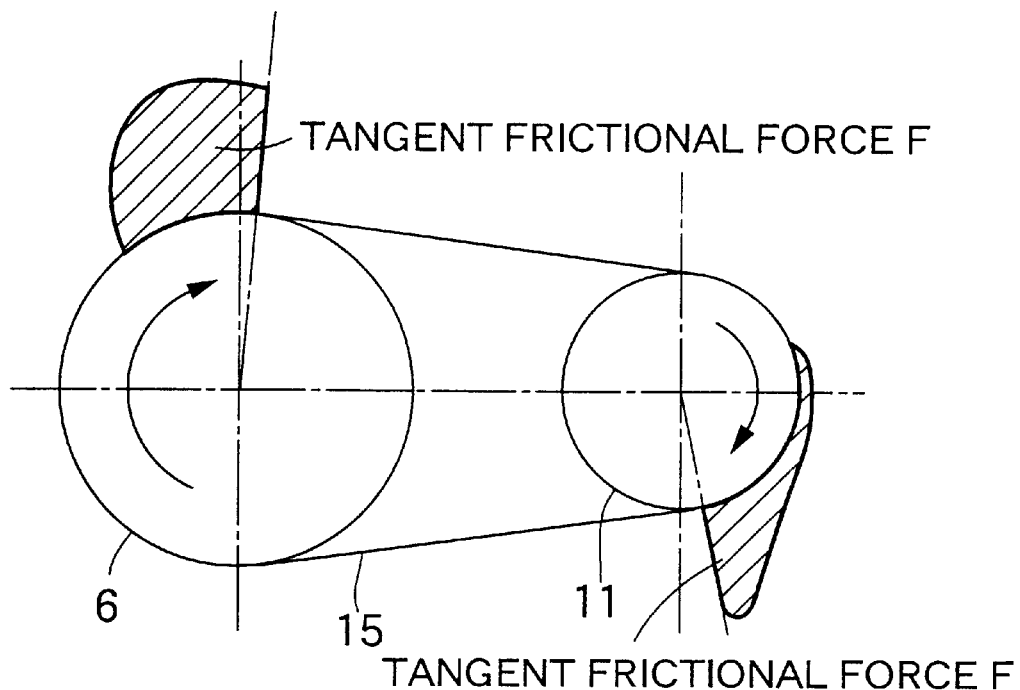
FIGS. 10A and 10B are graphs showing the distribution of the tangent frictional forces F received from pulleys by the metal element and the distribution of the urging force E between the metal elements, respectively.
Figure 10B:
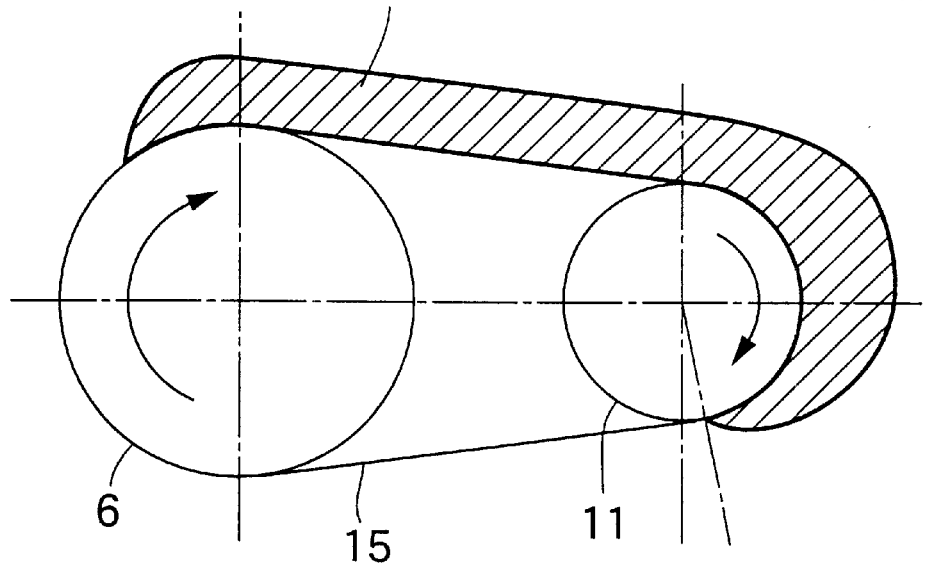

FIGS. 9A and 9B show variations in loads received from the innermost metal ring 33 by the rear end a and the front end b (in the direction of advancement) of the saddle surface 44 of the metal element 32, which variations have been detected by load sensors provided at the rear end a and the front end b of the saddle surface 44. At the rear end a of the saddle surface 44 of the metal element 32 shown in FIG. 9A, a load peak $P_{DR}$ is observed in the vicinity of the entrance of the drive pulley 6, and a load peak $P_{DN}$ is observed in the vicinity of the exit of the driven pulley 11. On the other hand, at the front end b of the saddle surface 44 shown in FIG. 9B, a load peak $P_{DR}$ is observed only in the vicinity of the entrance of the drive pulley 6.

The load peak $P_{DR}$ in the vicinity of the entrance of the drive pulley 6 is generated at both of the rear and front ends a and b of the saddle surface 44 in the direction of advancement. The reason is considered to be that the metal element 32 bites into the drive pulley 6 in a rolling state. On the other hand, the load peak $P_{DN}$ in the vicinity of the exit of the driven pulley 11, is generated at only the rear end a of the saddle surface 44 in the direction of advancement. The reason is considered to be that the metal element 32 falls forwards in the direction of advancement in the vicinity of the exit of the driven pulley 11.

The concentrated stress σH received from the rear end a (in the direction of advancement) of the saddle surface 44 of the metal element 32 by the innermost metal ring 33 at the location at which the metal element 32 leaves the driven pulley 11, will be considered below.

It is very difficult to geometrically determine the value of the concentrated stress σH due to a variety of factors, e.g., since the center of frictional action on the driven pulley 11 and the metal element 32 is indefinite. However, the value of the concentrated stress σH can be estimated according to the following equation using k as a test constant (a constant in a saddle surface stress concentration test):

$$\sigma H = p*(k*e/q)$$

wherein the definition of each of e, p and q is as follows:

e: a transmitted force per metal element (kgf/element)
p: an average compressive stress on the saddle surface (kg/mm$^2$)
q: an axial thrust per metal element (kgf/element)

In the above equation, the concentrated stress σH has been increased in accordance with increases in average compressive stress p on the saddle surface, transmitted force e per metal element and test constant k, and decreased in accordance with an increase in axial thrust q per metal element. The test constant k is a factor which is proportional to an increase in hertz face pressure due to an influence of the radius r of curvature of the rear end a of the saddle surface 44 in the direction of advancement. Therefore, the test constant k is represented by the following equation using c as a proportional constant:

$$k = c*(1/r)^{1/2}$$

In the present embodiment, the radius 1 of curvature of the rear end a in the direction of advancement is increased to 0.04 mm by the punching-shear drop, and the test constant k is decreased by about 70%, as compared with the case where the radius r of curvature of the rear end a in the direction of advancement is 0.02 mm. Thus, if the radius r of curvature of the rear end a of the saddle surface 44 in the direction of advancement is increased, for example, to a doubled value, the value of the test constant k can be decreased to decrease the concentrated stress σH received from the rear end a (in the direction of advancement) of the saddle surface 44 of the metal element 32 by the innermost metal ring 33 to about 70%.

By setting the radius i of curvature of the rear end a of the saddle surface 44. in the direction of advancement at a value larger than that of the front end 12 in the direction of advancement in the above manner, the stress received from the rear end a (in the direction of advancement) of the saddle surface 44 of the metal element 32 by the innermost metal ring 33 can be decreased to prolong the life of the entire metal ring assembly 31. Namely, in FIG. 6, as the concentrated stress σH is decreased, the stress amplitude Φa is decreased, while the stress center am is increased. This is an advantageous variation with regard to the fatigue life from the viewpoint of the common characteristics of a metal material, because the decrement in stress amplitude σa and the increment in stress center cam are equal to each other. Thus, it is possible to prolong the fatigue life of the innermost metal ring 33. Moreover, the rear end a (in the direction of advancement) of the saddle surface 44 having the large radius of curvature can be formed simultaneously with the fine blanking of the metal element 32 and hence, a special machining is not required, which can contribute to a reduction in processing cost.

A second embodiment of the present invention will now be described with reference to FIGS. 12 and 13.

Figure 3:
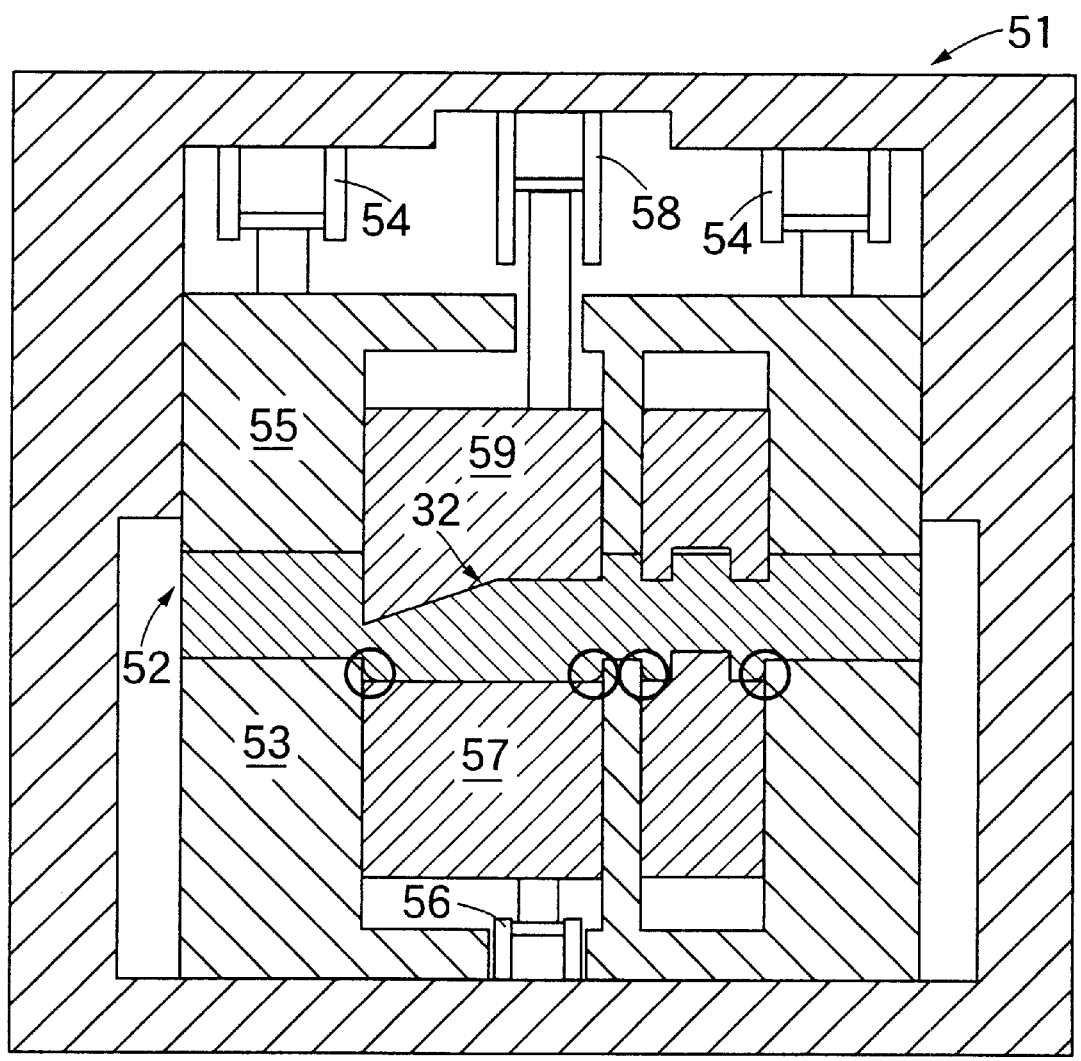
Figure 8:
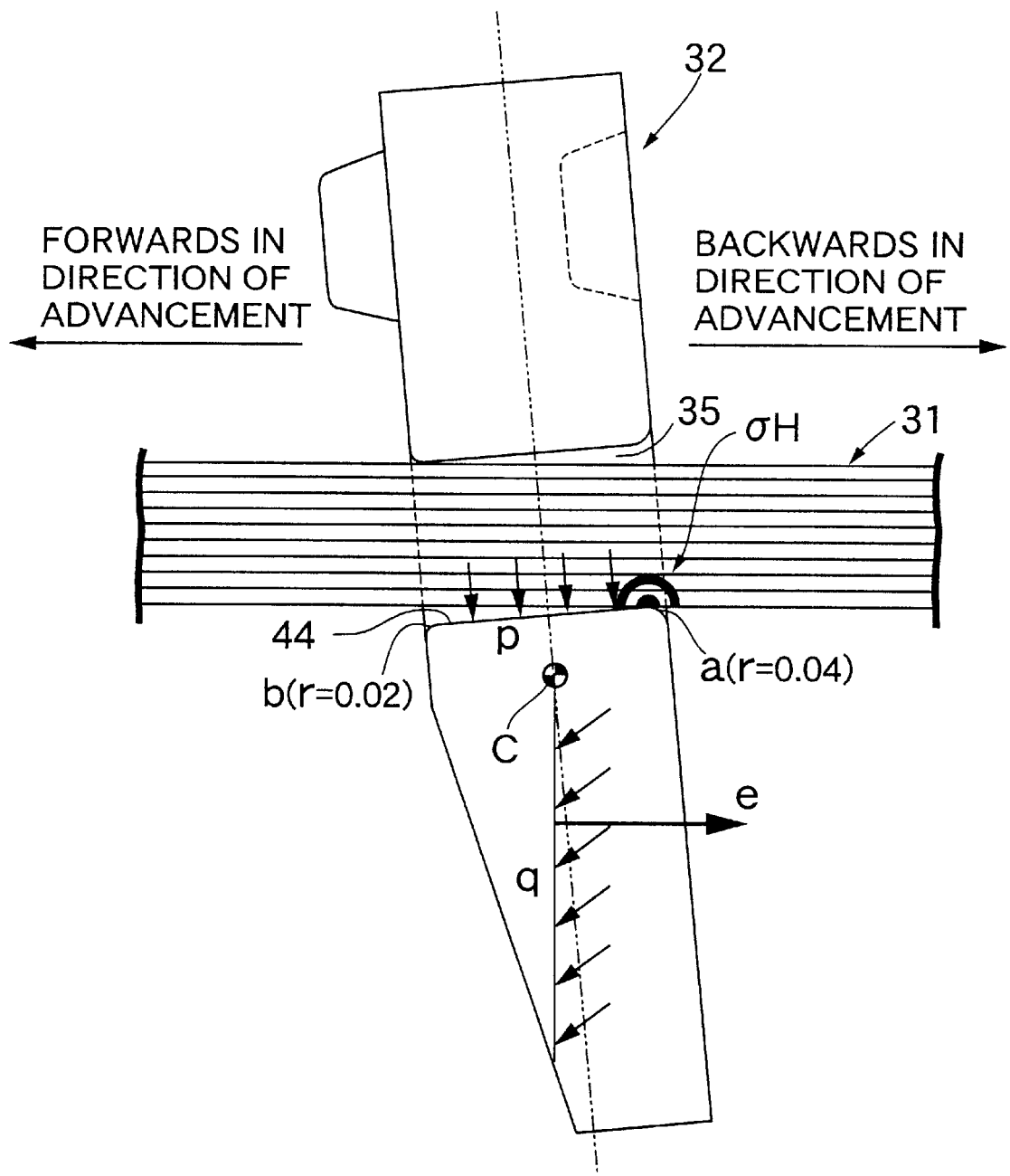
Figure 12:
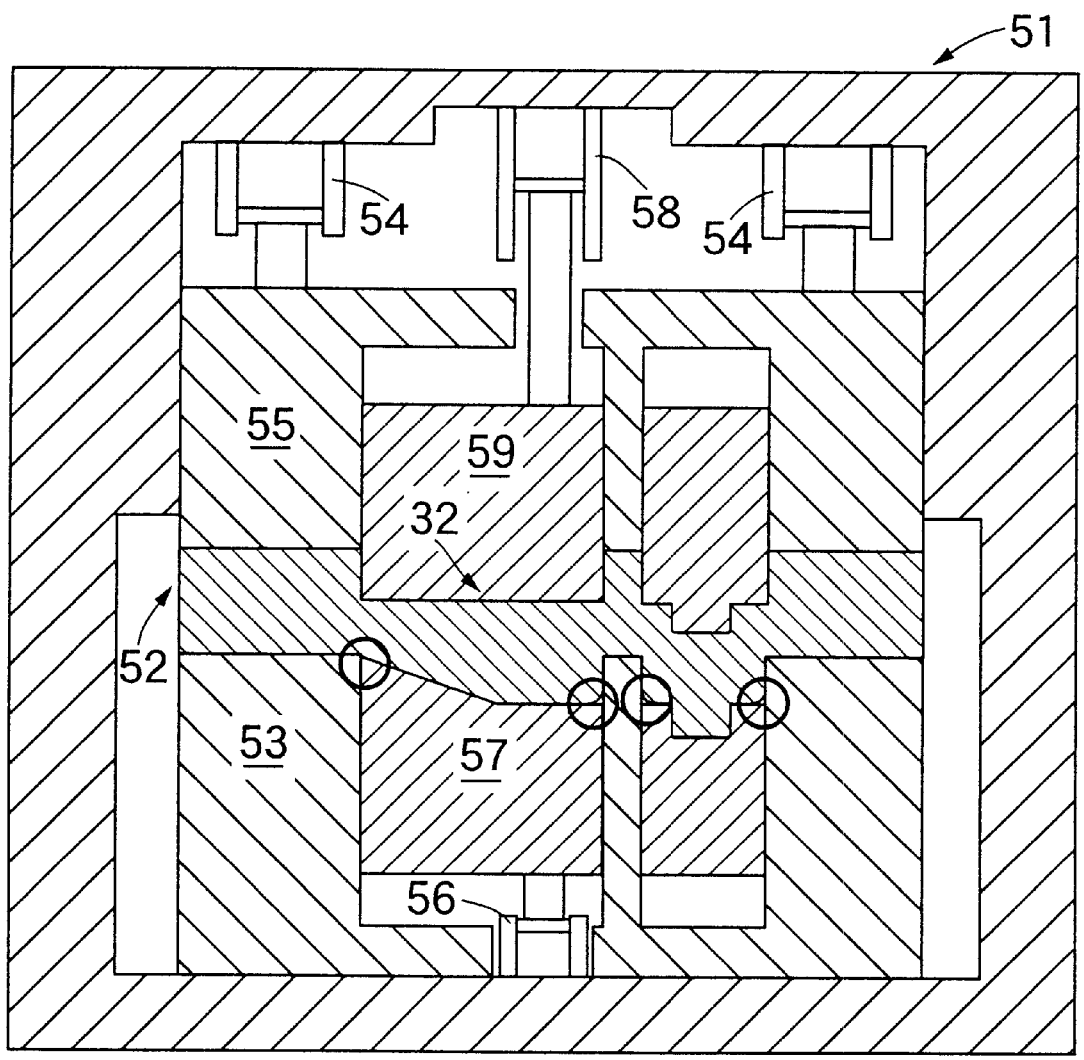
Figure 13:
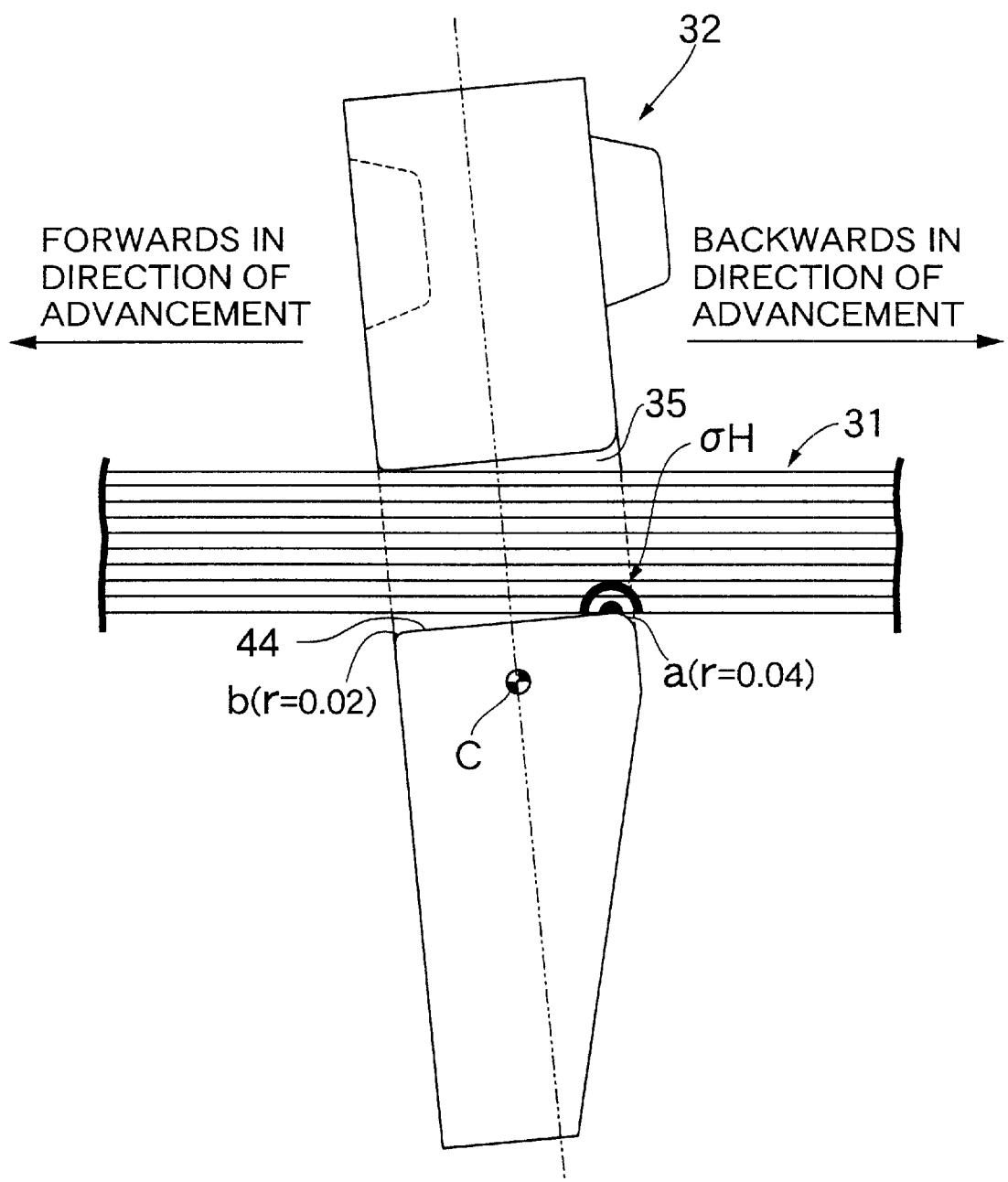

In the second embodiment shown in FIG. 12, the metal element 32 is subjected to a fine blanking in an inside-out state, as can be seen from the comparison of FIG. 3 and FIG. 12 with each other. More specifically, the second embodiment is different from the first embodiment in respect of that the rocking edge 41 of the metal element 32 in the first embodiment is directed forwards in the direction of advancement, as shown in FIG. 8, and the rocking edge 41 of the metal element 32 in the second embodiment is directed backwards in the direction of advancement. However, the radius of curvature of the rear end a in the direction of advancement in the second embodiment is also increased by a punching shear drop. Therefore, the same function and effect as in the first embodiment can be exhibited in the second embodiment.

Figure 14:
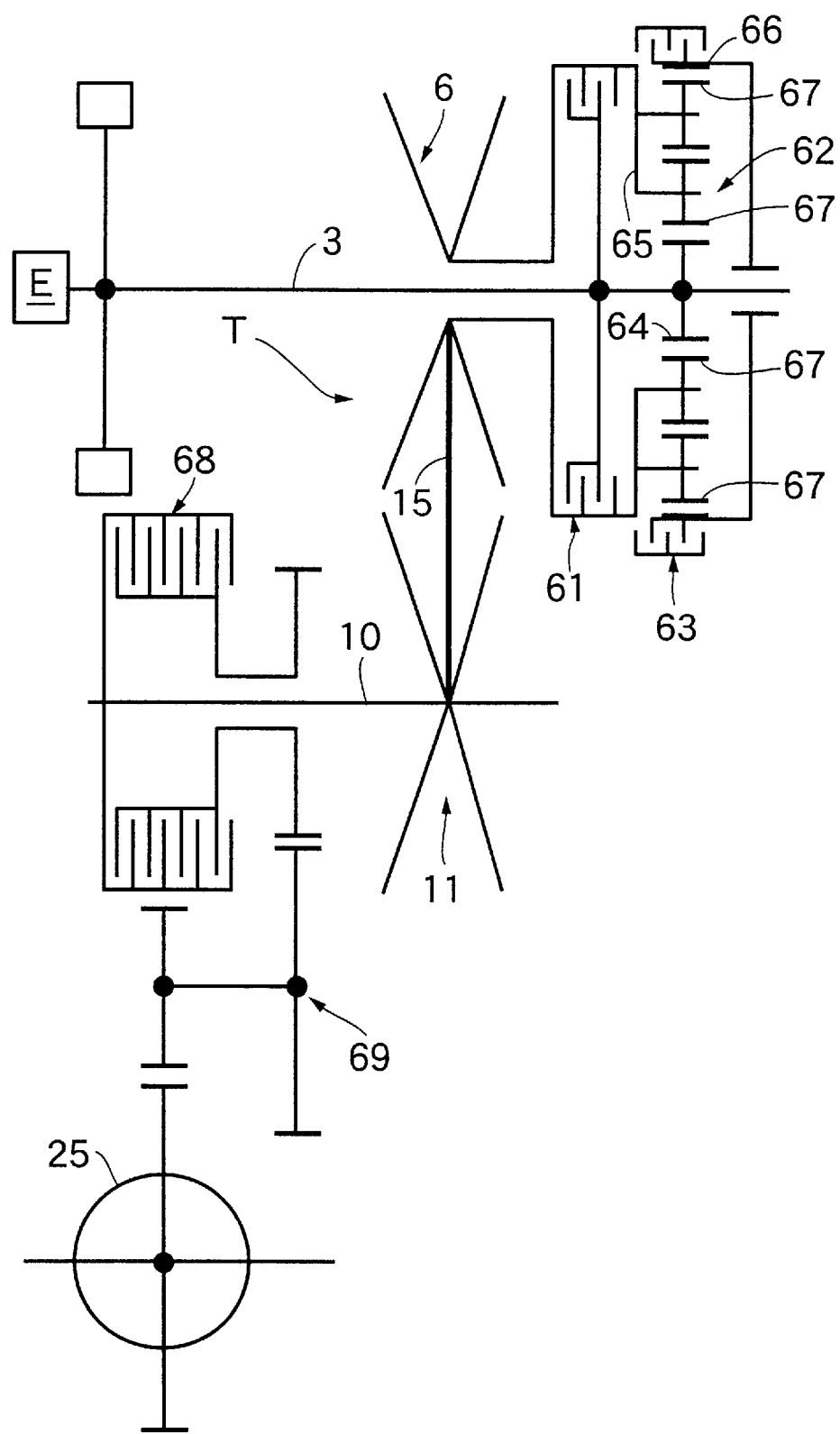
FIG. 14 is a skeleton illustration of a power transmitting system of a vehicle provided with a continuously variable transmission according to a third embodiment of the present invention.

In the metal belt type continuously variable transmission T shown in FIG. 1, the metal belt 15 is circulated in the same direction both during forward traveling of the vehicle and during backward traveling of the vehicle, but in a metal belt type continuously variable transmission T according to a third embodiment shown in FIG. 14, the direction of circulation of a metal belt 15 during forward traveling of the vehicle is opposite from that during backward traveling of the vehicle.

More specifically, a drive pulley 6 supported around an outer periphery of an input shaft 3 driven by an engine E is capable of being coupled to the input shaft 3 through a forward clutch 61, and capable of being coupled to the input shaft 3 through a planetary gear mechanism 62 and a reverse brake 63. The planetary gear mechanism 62 is of a double pinion type, and is comprised of a sun gear 64 integral with the input shaft 3, a planetary carrier 65 integral with the drive pulley 6, a ring gear 66 relatively rotatably carried on the input shaft 3, and planetary gears 67 which are carried on the planetary carrier 65 and meshed with the sun gear 64 and the ring gear 66. The reverse brake 63 is capable of coupling the ring gear 66 to a casing. A driven shaft 10 provided with a driven pulley 11, is connected to a differential 25 through a start clutch 68 and a reduction gear train 69.

During forward traveling of the vehicle, the forward clutch 61 is brought into an engaged state to couple the drive pulley 6 to the input shaft 3 and hence, the drive pulley 6 is revolved or rotated in the same direction as the input shaft 3. On the other hand, during backward traveling of the vehicle, the reverse brake 63 is brought into an engaged state to couple the ring gear 66 of the planetary gear mechanism 62 to the casing and hence, the planetary carrier 65 is rotated in a direction opposite from the direction of rotation of the input shaft 3 along with the drive pulley 6 with the rotation of the sun gear 64 integral with the input shaft 3.

In the metal belt type continuously variable transmission T in the third embodiment, the direction of the circulation of the metal belt 15 during forward traveling of the vehicle is opposite from that during backward traveling of the vehicle in the above manner. Therefore, even if the radius of curvature of the rear end a in the direction of advancement is set, so that it is larger than the radius of curvature of the front end b of the metal element 32 in the direction of advancement during forward traveling of the vehicle, the effect of the present invention cannot be exhibited, because the direction of circulation of the metal belt 15 is reversed during backward traveling of the vehicle. However, the frequency of backward traveling of the vehicle is far smaller than the frequency of forward traveling of the vehicle and hence, if the radius of curvature of the rear end a in the direction of advancement is set larger than the radius of curvature of the front end 12 of the metal element 32 in the direction of advancement on the basis of the direction of travel of the metal element 32 during forward traveling of the vehicle, the effect of the present invention can be exhibited over most of the time of traveling of the vehicle.

For example, the rear end a (in the direction of advancement) of the saddle surface 44 having the large radius of curvature is formed simultaneously with the fine blanking of the metal element 32 in the embodiment, but may be formed separately by machining.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A belt for a continuously variable transmission having a drive pulley and a driven pulley, comprising metal ring assemblies each having a plurality of endless metal rings laminated one on another, and a plurality of metal elements each having ring slots wherein said metal ring assemblies are fitted into said ring slots;

said belt being wound around said drive pulley and said driven pulley to transmit a driving force between the drive pulley and the driven pulley;

wherein a saddle surface of said ring slot, against which an inner circumferential surface of said metal ring assembly abuts, is formed such that a radius of a rear corner is larger than a radius of a front corner in a direction of advancement of said metal elements, wherein said saddle surface is substantially flat at a location between said front corner and said rear corner and relative to the direction of advancement of said metal elements, and wherein radii of curvature of the front and rear corners of each metal element are smaller than a thickness of the metal element as measured in the direction of advancement of the metal element.

2. A belt for a continuously variable transmission according to claim 1, wherein each of said metal elements is formed by punching from a metal plate material, and said rear corner in the travel direction is produced by a punching shear drop upon the punching.

3. A belt for a continuously variable transmission according to claim 1, wherein said belt is used in a continuously variable transmission of a vehicle, and the direction of travel of the metal element is a traveling direction during forward traveling of the vehicle.

* * * * *